(12) United States Patent
Ito (10) Patent No.: US 6,892,000 B2
(45) Date of Patent: May 10, 2005

(54) TUNABLE FILTER (75) Inventor: Tomoo Ito, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 165 days.

(21) Appl. No.: 10/306,363

(22) Filed: Nov. 27, 2002

(65) Prior Publication Data

US 2003/0108293 A1 Jun. 12, 2003

(30) Foreign Application Priority Data

Nov. 30, 2001 (JP) .................... P 2001-366126

(51) Int. Cl.⁷ .............................................. G02B 6/26
(52) U.S. Cl. ........................................ 385/31; 385/15
(58) Field of Search ............... 385/15–39; 359/494–500

(56) References Cited

U.S. PATENT DOCUMENTS 6,327,280 B1 * 12/2001 Ducellier et al. ............ 372/20
6,466,704 B1 * 10/2002 Frisken ........................ 385/11

FOREIGN PATENT DOCUMENTS

JP 2002-267951 9/2002

* cited by examiner

Primary Examiner—John D. Lee
Assistant Examiner—Jennifer Doan
(74) Attorney, Agent, or Firm—Fish & Richardson P.C.

(57) ABSTRACT

In a tunable filter for launching incident light from an input side optical fiber into a diffraction grating through a condenser lens and emitting emission light from the diffraction grating through the condenser lens and outputting output light of a selected wavelength through an output side optical fiber, one optical fiber common to input and output is provided between the input side optical fiber and the output side optical fiber and the condenser lens, and also optical circulator member is provided between the input side optical fiber and the output side optical fiber and the one common optical fiber.

8 Claims, 5 Drawing Sheets

11: BIREFRINGENT ELEMENT (RUTILE, CALCITE AND ETC.)

ROTATION MECHANISM FOR OPTICAL PATH
DIFFERENCE FINE ADJUSTMENT OF GLASS PLATE
FOR OPTICAL PATH DIFFERENCE CORRECTION

FIG. 6

POLARIZER   POLARIZATION ROTATION ELEMENT
(HALF-WAVE PLATE, GARNET
THICK FILM AND ETC.)

FIG. 7

BIREFRINGENT ELEMENT   POLARIZATION ROTATION ELEMENT
(RUTILE, CALCITE AND ETC.)   (HALF-WAVE PLATE, GARNET
THICK FILM AND ETC.)

COUPLING EFFICIENCY BECOMES MAXIMUM IN CASE OF F = F'

FIG. 10

COUPLING EFFICIENCY BECOMES WORSE IN CASE OF F < F'

FIG. 11

TUNABLE FILTER

BACKGROUND OF THE INVENTION

The present invention relates to a tunable filter using a diffraction grating for selectively passing only light of an arbitrary wavelength.

As a tunable filter for selectively passing only light of an arbitrary wavelength, there is the tunable filter using a band-pass filter.

Further, as a tunable filter using a diffraction grating, it is applied from the same applicant as the Japanese Patent Application No. 2001-066682.

Figure 8:
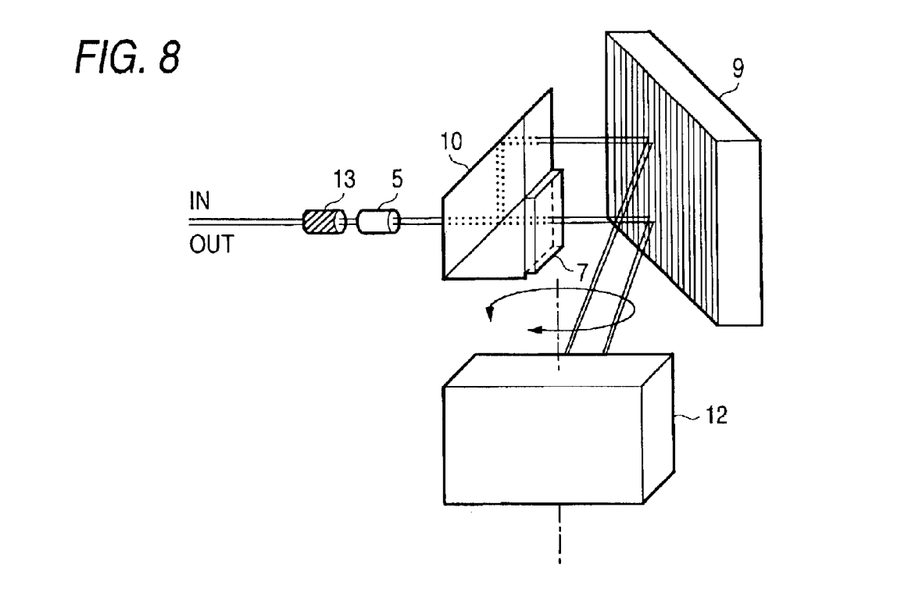
FIG. 8 is a diagram showing a tunable filter (a reference example) using a diffraction grating which is a premise of the invention.

FIG. 8 is a diagram showing one example of a tunable filter described in the application using a diffraction grating which is a premise of the present invention as a reference example.

In FIG. 8, numeral 13 is a two-core fiber for both input light and output light, and numeral 5 is a condenser lens.

Incidentally, the condenser lens 5 may be a GRIN lens (gradient index lens).

Further, numeral 9 is a diffraction grating, and numeral 10 is a parallelogram prism type polarizer, and numeral 7 is a polarization rotation element. The polarization rotation element includes a half-wave plate or a garnet thick film, and as the wave plate, a zero-order wave plate capable of use at a wide wavelength band is desirable.

Further, numeral 12 is a total reflection mirror and is constructed rotatably as shown by an arrow of the drawing in order to change an angle again launched into the diffraction grating after reflecting light from the diffraction grating 9.

By this configuration, a selection of a wavelength outputted can be made by rotating the total reflection mirror 12 as shown in the drawing to adjust an angle with respect to input light of the diffraction grating.

Then, while the plane of polarization with low diffraction efficiency of the diffraction grating of one of the polarized waves split by the parallelogram prism type polarizer 10 is polarized and rotated 90° by the polarization rotation element 7 and is launched to the diffraction grating 9, the plane of polarization of the other split by the parallelogram prism type polarizer 10 is reflected by a reflection surface of the parallelogram prism type polarizer 10 and is launched to the diffraction grating 9 and both the planes are joined by the condenser lens 5.

In this example, by the total reflection mirror 12, light from the diffraction grating 9 is reflected and is again returned to the diffraction grating, so that the light passes through the diffraction grating two times and selectivity of a wavelength can be improved more.

Further, by using the two-core fiber 13, it has a feature that one condenser lens will suffice and an apparatus can be constructed at low cost.

Since the filter described in FIG. 8 shown as the reference example described above does input and output of light opposed to the condenser lens by the two-core fiber, cores of fibers forming the two-core fiber are arranged with the cores offset by a radius (for example, 62.5 µm) of the fiber from the center of the lens, so that the following problem arises.

The problem will be described in detail using FIGS. 9 and 10.

Figure 9:
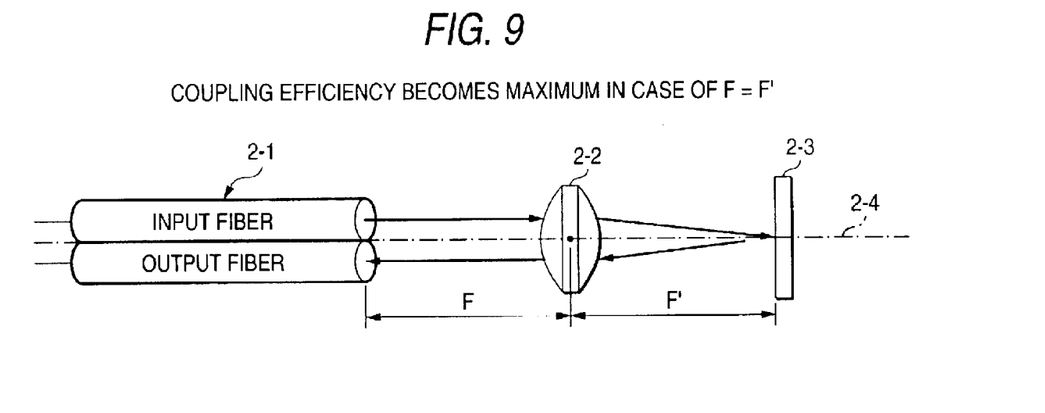
FIG. 9 is a diagram showing an arrangement relation among a two-core fiber 2-1, a condenser lens 2-2 and a total reflection mirror 2-3 in a reference example.

FIG. 9 is a diagram showing an arrangement relation among a two-core fiber 2-1, a condenser lens 2-2 and a total reflection mirror 2-3.

In FIG. 9, an input fiber 2-1a and an output fiber 2-1b forming the two-core fiber 2-1 are arranged with the fibers respectively offset (shifted) by a radius (for example, 62.5 µm) of the fiber from the center 2-4 of the lens 2-2 as shown in the drawing.

In order to couple light emitted from the input fiber 2-1a to the output fiber efficiently in such arrangement, it is necessary to arrange the total reflection mirror 2-3 in a length (F') equal to a focal length (F) of the condenser lens 2-2 (that is, coupling efficiency becomes maximum in the case of F=F').

Figure 10:
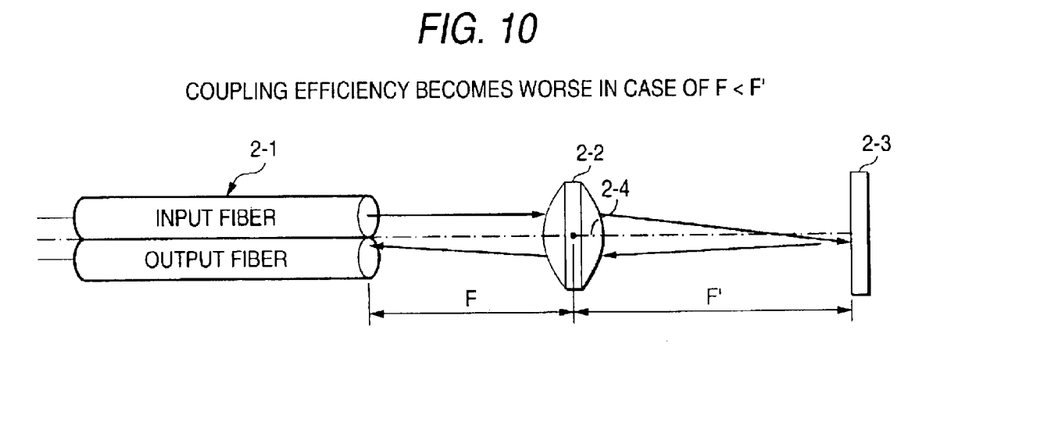
FIG. 10 is a diagram showing a case that the arrangement relation among the two-core fiber 2-1, the condenser lens 2-2 and the total reflection mirror 2-3 in the reference example became (F<F')

However, in the tunable filter, a polarization split element, a ½λ wave plate and a diffraction grating are arranged between a condenser lens and a total reflection mirror as shown in FIG. 8 and a long optical path length is required, so that there is a problem that arrangement balance is lost and coupling efficiency becomes worse as shown in FIG. 10.

In FIG. 10, in a manner similar to FIG. 9, the input fiber 2-1a and the output fiber 2-1b forming the two-core fiber 2-1 are arranged with the fibers respectively offset (shifted) by a radius (for example, 62.5 µm) of the fiber from the center 2-4 of the lens 2-2 as shown in the drawing.

Then, the polarization split element, the ½λ wave plate and the diffraction grating are arranged between the condenser lens and the total reflection mirror, a length of F' becomes long (that is, the coupling efficiency becomes worse in the case of F<F').

Therefore, in order to improve deterioration of the coupling efficiency in the case of FIG. 10, a condenser lens with a long focal length (F) is used, but in the lens with the long focal length (F), not only its outer diameter becomes large but also a beam diameter becomes thick.

Because of that, the used polarization split element, the ½λ wave plate, the diffraction grating and the total reflection mirror with the size corresponding to the lens become necessary and an optical path length also becomes long, so that a problem that the whole apparatus becomes large arises.

SUMMARY OF THE INVENTION

An object of the invention is to provide a tunable filter in which an optical fiber for input and output opposed to a condenser lens is formed into one fiber and constraint of a length between the condenser lens and a total reflection mirror is eliminated.

In order to solve the problem, in a tunable filter for launching incident light from an input side optical fiber into a diffraction grating through a condenser lens and emitting emission light from the diffraction grating through the condenser lens and outputting output light of a selected wavelength through an output side optical fiber, one optical fiber common to input and output is provided between the input side optical fiber and the output side optical fiber and the condenser lens, and also optical circulator member is provided between the input side optical fiber and the output side optical fiber and the one common optical fiber, and thereby an optical fiber for input and output opposed to the condenser lens is formed into one fiber and constraint of a length between the condenser lens and a total reflection mirror can be eliminated (aspect 1).

Further, member for splitting incident light and member for rotating a plane of polarization of one of the split light 90° are provided between the condenser lens and the diffraction grating, and light with the plane of polarization rotated 90° and the other light polarized and split are launched into the diffraction grating and also an angle of incident light with respect to the diffraction grating is adjusted, and thereby output light of a selected wavelength can be obtained (aspect 2).

Further, by setting the light with the plane of polarization rotated 90° to light with a plane of polarization having low diffraction efficiency of the diffraction grating, a tunable filter with low loss can be constructed (aspect 3).

Further, the member for polarizing and splitting the incident light can be constructed of a cube type polarizer and a mirror (aspect 4).

Further, by adopting a parallelogram prism type polarizer as the member for polarizing and splitting the incident light, the cube type polarizer and the mirror can be constructed integrally and miniaturization can be done and also the need for the mirror is eliminated (aspect 5).

Further, by adopting a birefringent element as the member for polarizing and splitting the incident light, in a manner similar to the case as defined in aspect 5, the cube type polarizer and the mirror can be constructed integrally and miniaturization can be done and also the need for the mirror is eliminated.

Further, rutile or calcite can be used as the birefringent element (aspect 6).

Further, output light from the diffraction grating is reflected by reflection member and is again launched into the diffraction grating, and thereby the diffraction grating can be passed two times, so that selectivity of a wavelength improves and only light with a wavelength of narrower range can be outputted (aspect 7).

Further, optical path difference correction member is inserted into at least one of optical paths of one light and the other light polarized and split, and thereby an optical path can be substantially lengthened by the optical path difference correction member inserted into a short optical path to equalize the two optical paths (aspect 8).

Further, an optical path length can be varied by a glass plate capable of adjusting an angle with respect to an optical path as the optical path difference correction member (aspect 9).

DETAILED DESCRIPTION OF THE PREFERRED EMBODIMENTS

A principle of the invention will be described using FIG. 11.

Figure 11:
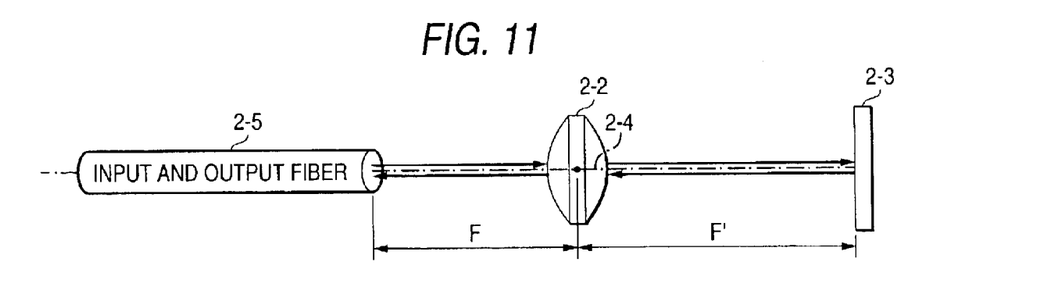
FIG. 11 is a diagram showing a case that one optical fiber 2-5 used as both an input fiber and an output fiber with respect to a condenser lens is arranged in the center 2-4 of a condenser lens 2-2.

In FIG. 11, one optical fiber 2-5 used as both an input fiber and an output fiber with respect to a condenser lens is arranged in the center 2-4 of a condenser lens 2-2.

In the case of such arrangement, light emitted from the input fiber and light returning to the output fiber pass through the center of the condenser lens, so that coupling efficiency can be maximized irrespective of a focal length (F) of the condenser lens 2-2 and a length (F') from the condenser lens to a total reflection mirror.

However, in order to implement a configuration of FIG. 11, it is necessary to split light passing through the input and output optical fiber 2-5 into an input optical fiber and an output optical fiber.

Then, in the invention, an optical circulator is used for splitting the light into the input optical fiber and the output optical fiber.

Therefore, the need to arrange a total reflection mirror 2-3 in a length (F') equal to a focal length (F) of the condenser lens as the case of using a two-core fiber is eliminated and a selection of the condenser lens can be made freely and also a beam diameter can be designed thinly, so that the whole apparatus can be miniaturized.

Next, a first embodiment of a tunable filter to which an optical circulator of the invention is applied will be described using FIG. 1.

Figure 1:
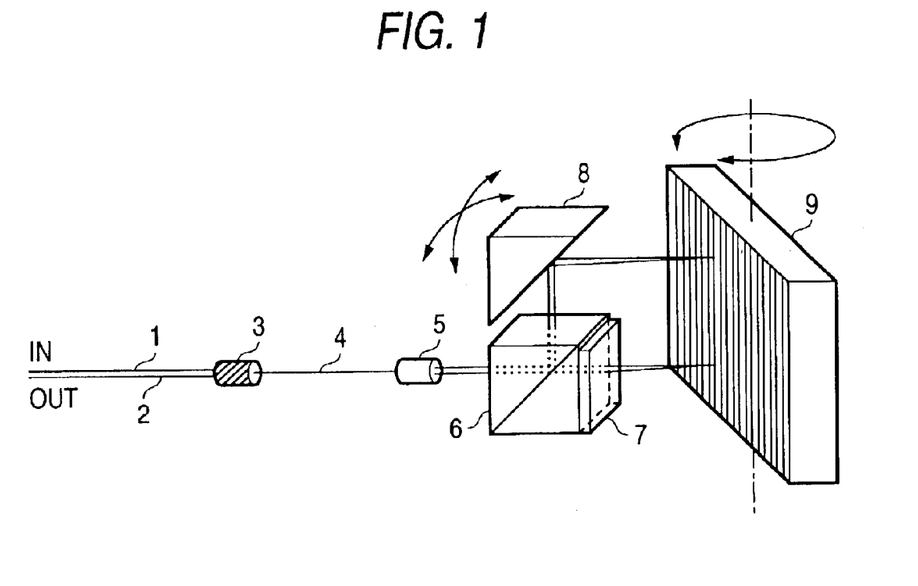
FIG. 1 is a diagram showing a first embodiment of a tunable filter to which an optical circulator of the invention is applied.

In FIG. 1, numeral 3 is an optical circulator connected between an input side optical fiber 1 and an output side optical fiber 2 and one optical fiber 4 arranged opposed to a condenser lens 5.

Incidentally, as the optical circulator 3, other things may be used as long as they have a function of connecting the one optical fiber 4 to the input side optical fiber 1 and the output side optical fiber 2 and splitting light.

Further, a GRIN lens (gradient index lens) can be used as the condenser lens 5.

Further, numeral 9 is a diffraction grating, and the diffraction grating is constructed rotatably as shown by an arrow of the drawing in order to change an angle of incidence of light passing through the condenser lens 5.

Further, numeral 6 is a cube type polarizer, and numeral 7 is a polarization rotation element. The polarization rotation element includes a half-wave plate or a garnet thick film, and as the wave plate, a zero-order wave plate capable of use at a wide wavelength band is desirable.

Further, numeral 8 is a mirror which is provided in order to output light from the polarizer 6 to the diffraction grating 9 and also return the diffracted light to the polarizer 6 again.

By this configuration, a selection of a wavelength can be made by rotating the diffraction grating 9 as shown by the arrow of the drawing to adjust an angle with respect to input light of the diffraction grating 9.

Then, while the plane of polarization with low diffraction efficiency of the diffraction grating of one of the polarized waves split by the polarizer 6 is polarized and rotated 90° by the polarization rotation element 7 and is launched to the diffraction grating 9, the plane of polarization of the other split by the polarizer 6 is launched to the diffraction grating 9 through the mirror 8, and reflected light selected is joined and both the planes are joined by the condenser lens 5.

In the tunable filter of FIG. 1, the diffraction grating is used, so that the optical fiber 4 arranged opposed to the condenser lens 5 can be formed into one fiber to match the center of the optical fiber with the center of the condenser lens 5 while a wavelength variable range can be widened and also a PDL (polarization dependent loss) of the diffraction grating can be improved.

Therefore, in the configuration of FIG. 1, the need to arrange the diffraction grating 9 (for FIG. 1, the diffraction grating 9 corresponds to the total reflection mirror 2-3 of FIG. 11) in a length (F') equal to a focal length (F) of the condenser lens is eliminated and a selection of the condenser lens can be made freely and also a beam diameter can be designed thinly, so that the whole apparatus can be miniaturized.

Further, a second embodiment of a tunable filter to which an optical circulator of the invention is applied will be described using FIG. 2.

Figure 2:
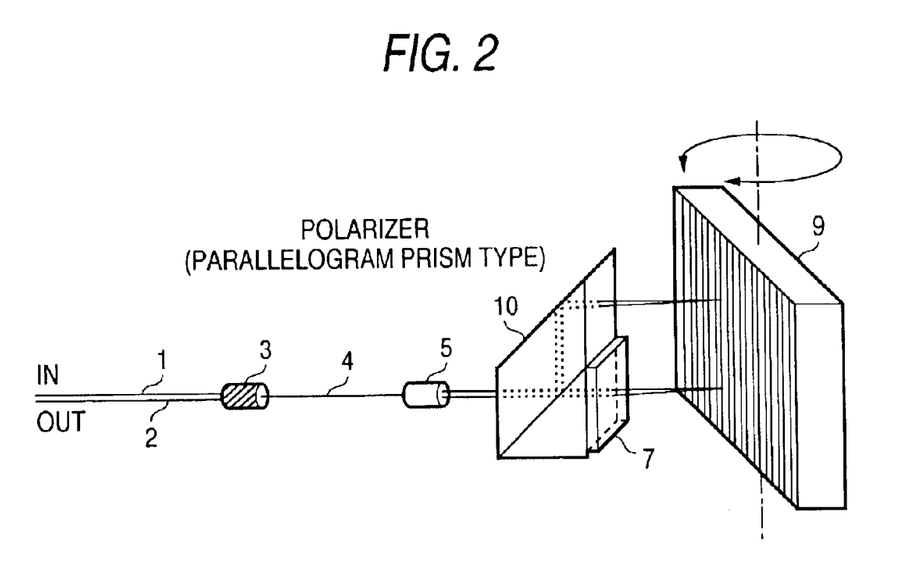
FIG. 2 is a diagram showing a second embodiment of a tunable filter to which an optical circulator of the invention is applied.

In FIG. 2, numeral 3 is an optical circulator connected between an input side optical fiber 1 and an output side optical fiber 2 and one optical fiber 4 arranged opposed to a condenser lens 5.

Further, numeral 9 is a diffraction grating, and the diffraction grating is constructed rotatably as shown by an arrow of the drawing in order to change an angle of incidence of light passing through the condenser lens 5.

Further, numeral 10 is a parallelogram prism type polarizer and has a function of combining the cube type polarizer 6 and the mirror 8 in FIG. 1.

Further, numeral 7 is a polarization rotation element, and the polarization rotation element includes a half-wave plate or a garnet thick film, and as the wave plate, a zero-order wave plate capable of use at a wide wavelength band is desirable.

Figure 6:
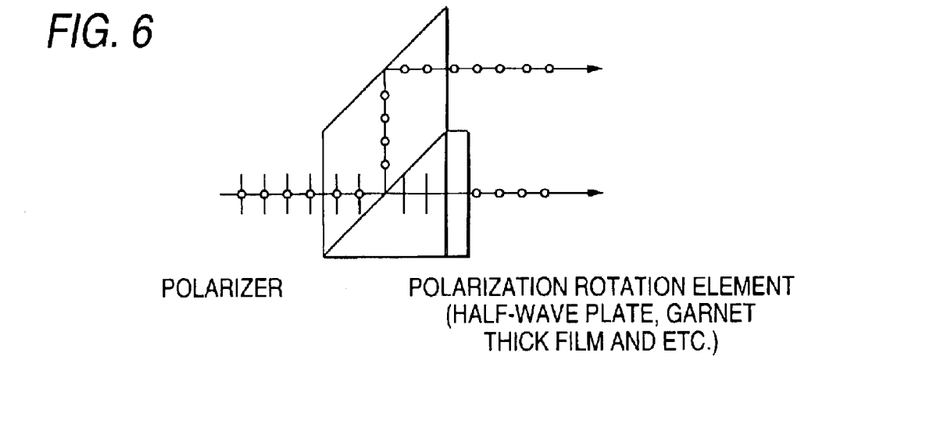
FIG. 6 is a diagram showing a concept of splitting input light by a parallelogram prism type polarizer 10 and a polarization rotation element 7 in FIG. 2 and producing an output with a plane of polarization aligned.

FIG. 6 is a diagram showing a concept of splitting input light by the parallelogram prism type polarizer 10 and the polarization rotation element 7 in FIG. 2 and producing an output with a plane of polarization aligned.

In FIG. 6, incident light including longitudinal and transverse polarized waves is split into the longitudinal polarized wave and the transverse polarized wave, and the longitudinal polarized wave is rotated 90° by the polarization rotation element, and both the polarized waves are aligned to the transverse polarized wave and are outputted.

By this configuration, a selection of a wavelength can be made by rotating the diffraction grating 9 as shown in the drawing to adjust an angle with respect to input light of the diffraction grating.

Then, while a plane of polarization with low diffraction efficiency of the diffraction grating of one of polarized waves split by the parallelogram prism type polarizer 10 is polarized and rotated 90° by the polarization rotation element 7 and is launched to the diffraction grating 9, a plane of polarization of the other split by the parallelogram prism type polarizer 10 is reflected by a reflection surface of the parallelogram prism type polarizer 10 and is launched to the diffraction grating 9, and both the planes are joined by the condenser lens 5.

In the tunable filter to which the optical circulator of FIG. 2 is applied, the diffraction grating is used, so that the optical fiber 4 arranged opposed to the condenser lens 5 can be formed into one fiber to match the center of the optical fiber with the center of the condenser lens 5 while a wavelength variable range can be widened and also a PDL (polarization dependent loss) of the diffraction grating can be improved.

Therefore, in the configuration of FIG. 2, the need to arrange the diffraction grating 9 (for FIG. 2, the diffraction grating 9 corresponds to the total reflection mirror 2-3 of FIG. 11) in a length (F') equal to a focal length (F) of the condenser lens is eliminated and a selection of the condenser lens can be made freely and also a beam diameter can be designed thinly, so that the whole apparatus can be miniaturized.

Further, since the parallelogram prism type polarizer is used as a polarizer, an apparatus can be miniaturized while the need for a mirror adjustment is eliminated.

Figure 3:
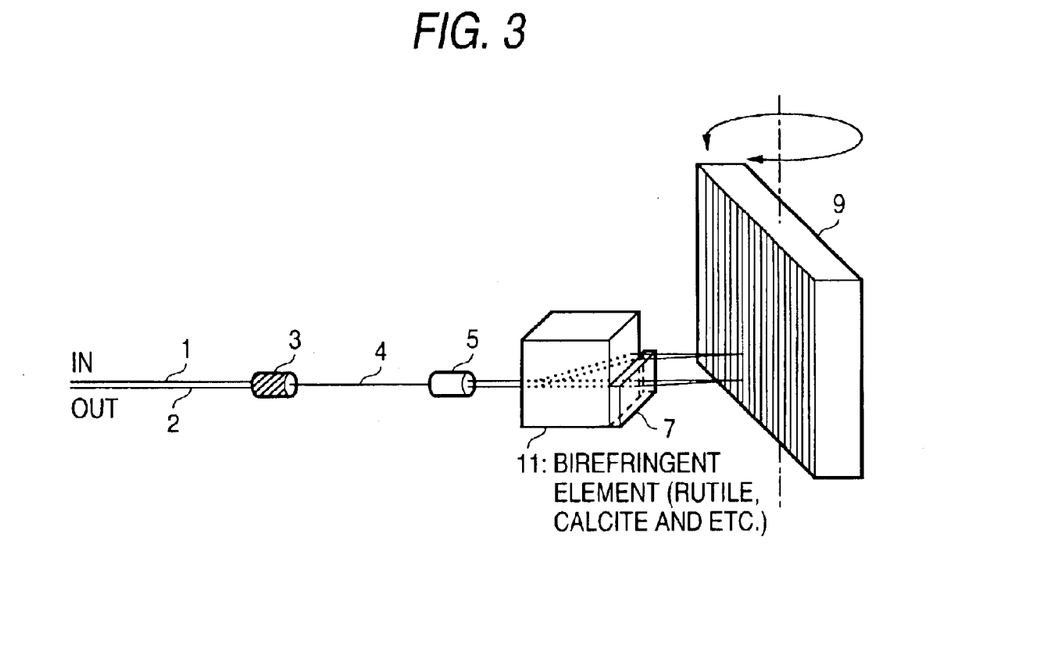
FIG. 3 is a diagram showing a third embodiment of a tunable filter to which an optical circulator of the invention is applied.

FIG. 3 is a diagram showing a configuration of a third embodiment of a tunable filter to which an optical circulator of the invention is applied.

In FIG. 3, numeral 3 is an optical circulator connected between an input side optical fiber 1 and an output side optical fiber 2 and one optical fiber 4 arranged opposed to a condenser lens 5.

Further, numeral 9 is a diffraction grating, and the diffraction grating is constructed rotatably as shown by an arrow of the drawing in order to change an angle of incidence of light passing through the condenser lens 5.

Further, numeral 11 is a birefringent element made of rutile or calcite, etc. and has a function similar to that of the parallelogram prism type polarizer 10 of FIG. 2.

Further, numeral 7 is a polarization rotation element, and the polarization rotation element includes a half-wave plate or a garnet thick film, and as the wave plate, a zero-order wave plate capable of use at a wide wavelength band is desirable.

Figure 7:
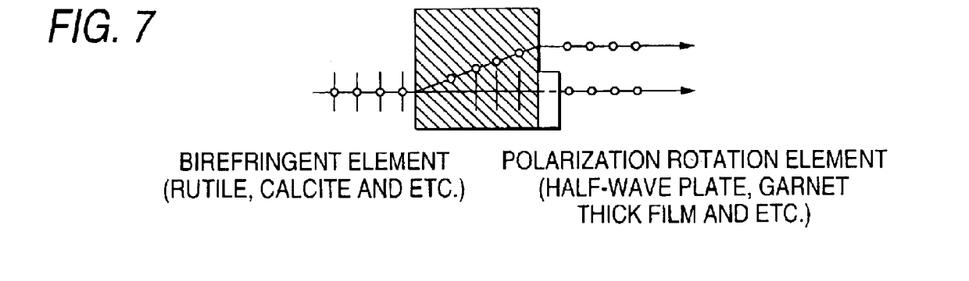
FIG. 7 is a diagram showing a concept of splitting input light by a birefringent element and a polarization rotation element and producing an output with a plane of polarization aligned.

FIG. 7 is a diagram showing a concept of splitting input light by the birefringent element and the polarization rotation element and producing an output with polarized waves aligned.

In FIG. 7, incident light including longitudinal and transverse polarized waves is split into the longitudinal polarized wave and the transverse polarized wave, and the longitudinal polarized wave is rotated 90° by the polarization rotation element, and both the polarized waves are aligned to the transverse polarized wave and are outputted.

By this configuration, a selection of a wavelength can be made by rotating the diffraction grating 9 as shown by an arrow of the drawing to adjust an angle with respect to input light of the diffraction grating.

Then, while a plane of polarization with low diffraction efficiency of the diffraction grating of one of polarized waves split by the birefringent element 11 is polarized and rotated 90° by the polarization rotation element 7 and is launched to the diffraction grating 9, a plane of polarization of the other split by the birefringent element 11 is reflected by a reflection surface of the polarizer 11 and is launched to the diffraction grating, and both the planes are joined by the condenser lens 5.

In the tunable filter to which the optical circulator of FIG. 3 is applied, the diffraction grating is used, so that the optical fiber 4 arranged opposed to the condenser lens 5 can be formed into one fiber to match the center of the optical fiber with the center of the condenser lens 5 while a wavelength variable range can be widened and also a PDL (polarization dependent loss) of the diffraction grating can be improved.

Therefore, in the configuration of FIG. 3, the need to arrange the diffraction grating 9 (for FIG. 3, the diffraction grating 9 corresponds to the total reflection mirror 2-3 of FIG. 11) in a length (F') equal to a focal length (F) of the condenser lens is eliminated and a selection of the condenser lens can be made freely and also a beam diameter can be designed thinly, so that the whole apparatus can be miniaturized.

Further, since the birefringent element 11 is used as a polarizer, an apparatus can be miniaturized while the need for a mirror adjustment is eliminated.

Figure 4:
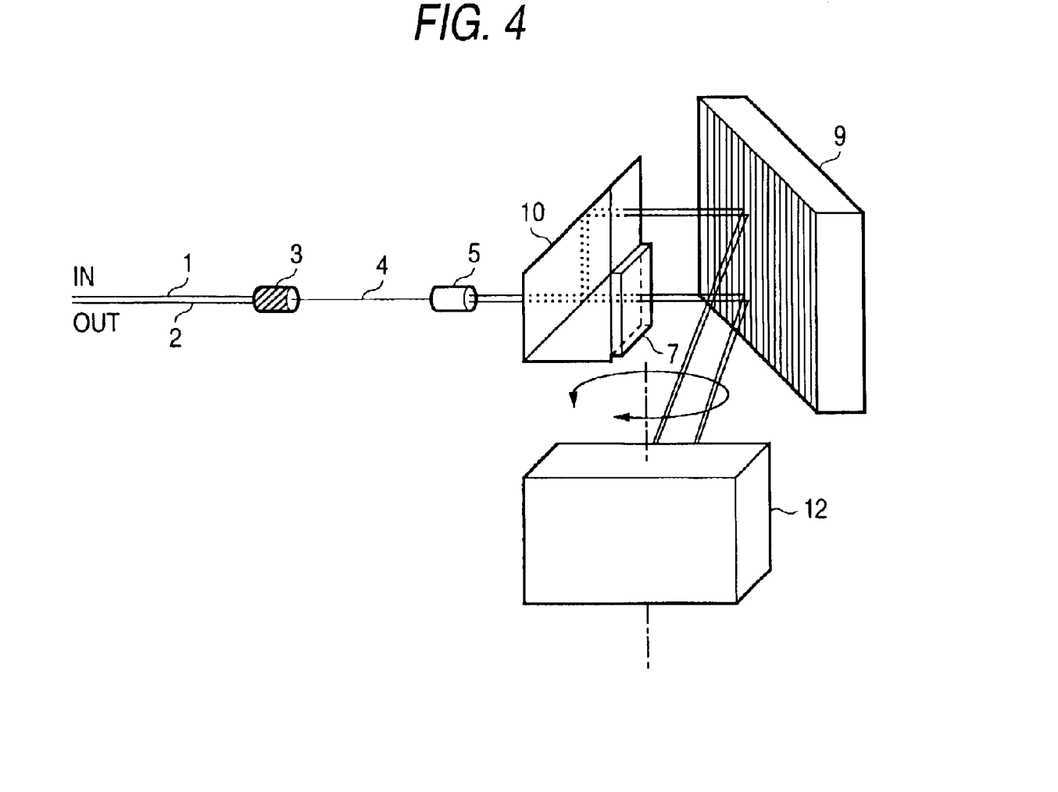
FIG. 4 is a diagram showing a fourth embodiment of a tunable filter to which an optical circulator of the invention is applied.

FIG. 4 is a diagram showing a configuration of a fourth embodiment of a tunable filter to which an optical circulator of the invention is applied.

In FIG. 4, numeral 3 is an optical circulator connected between an input side optical fiber 1 and an output side optical fiber 2 and one optical fiber 4 arranged opposed to a condenser lens 5.

Further, numeral 9 is a diffraction grating, and numeral 12 is a mirror which is a mirror for reflecting light from the diffraction grating and launching the light to the diffraction grating again and selectively reflects the light by rotating a total reflection mirror as shown by an arrow of the drawing.

By this configuration, a selection of a wavelength can be made by rotating the total reflection mirror 12 as shown in the drawing to adjust an angle with respect to input light.

Then, while a plane of polarization with low diffraction efficiency of the diffraction grating of one of polarized waves split by a parallelogram prism type polarizer 10 is polarized and rotated 90° by a polarization rotation element 7 and is launched to the diffraction grating 9, a plane of polarization of the other split by the parallelogram prism type polarizer 10 is reflected by a reflection surface of the parallelogram prism type polarizer 10 and is launched to the diffraction grating, and both the planes are joined by the condenser lens 5.

In this example, by the total reflection mirror 12, light from the diffraction grating is reflected and is again returned to the diffraction grating, so that the light passes through the diffraction grating two times and selectivity of a wavelength can be improved more.

In the tunable filter to which the optical circulator of FIG. 4 is applied, the diffraction grating is used, so that the optical fiber 4 arranged opposed to the condenser lens 5 can be formed into one fiber to match the center of the optical fiber with the center of the condenser lens 5 while a wavelength variable range can be widened and also a PDL (polarization dependent loss) of the diffraction grating can be improved.

Therefore, in the configuration to which the optical circulator of FIG. 4 is applied, the need to arrange the total reflection mirror 12 in a length (F') equal to a focal length (F) of the condenser lens is eliminated and a selection of the condenser lens can be made freely and also a beam diameter can be designed thinly, so that the whole apparatus can be miniaturized.

Figure 5A:
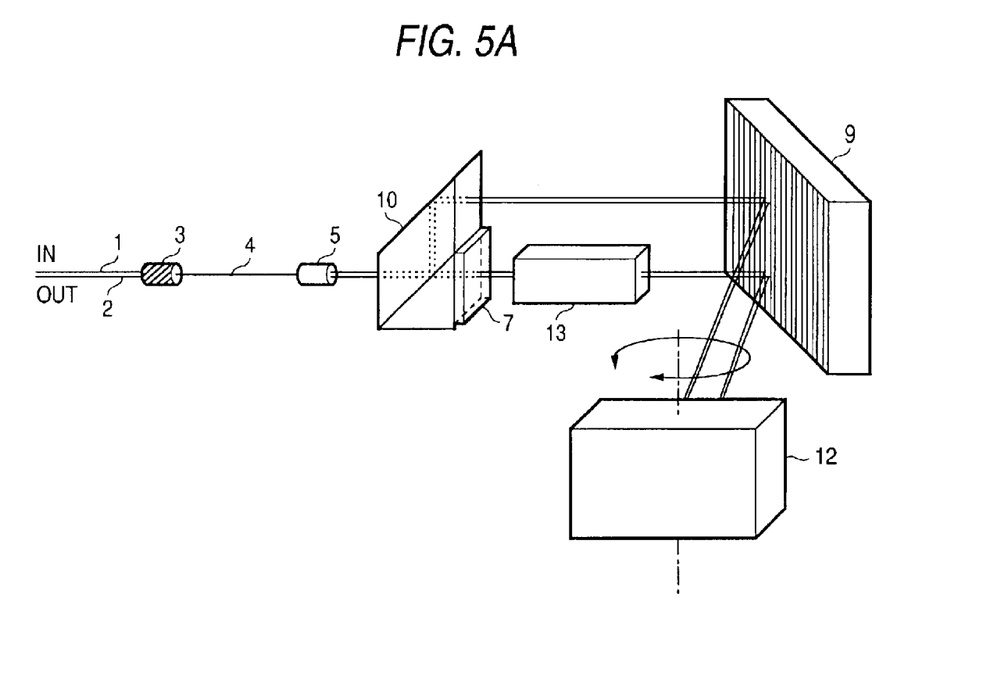
FIGS. 5A and 5B are diagrams showing a fifth embodiment of a tunable filter to which an optical circulator of the invention is applied.

FIG. 5A is a diagram showing a configuration of a fifth embodiment of a tunable filter to which an optical circulator of the invention is applied.

In FIG. 5A, numeral 3 is an optical circulator connected between an input side optical fiber 1 and an output side optical fiber 2 and one optical fiber 4 arranged opposed to a condenser lens 5.

Further, numeral 9 is a diffraction grating, and numeral 12 is a mirror which is a mirror for reflecting light from the diffraction grating and launching the light to the diffraction grating again and selectively reflects the light by rotating a total reflection mirror as shown by an arrow of the drawing.

By this configuration, a selection of a wavelength can be made by rotating the total reflection mirror 12 as shown in the drawing to adjust an angle with respect to input light.

Then, while a plane of polarization with low diffraction efficiency of the diffraction grating of one of polarized waves split by a parallelogram prism type polarizer 10 is polarized and rotated 90° by a polarization rotation element 7 and is launched to the diffraction grating 9, a plane of polarization of the other split by the parallelogram prism type polarizer 10 is reflected by a reflection surface of the parallelogram prism type polarizer 10 and is launched to the diffraction grating, and both the planes are joined by the condenser lens 5.

In this example, by the total reflection mirror 12, light from the diffraction grating is reflected and is again returned to the diffraction grating, so that the light passes through the diffraction grating two times and selectivity of a wavelength can be improved more.

Further, numeral 13 is a glass plate for optical path difference correction and is inserted into the side of a short optical path in order to correct the difference between lengths of two optical paths split by the polarizer 10.

Figure 5B:
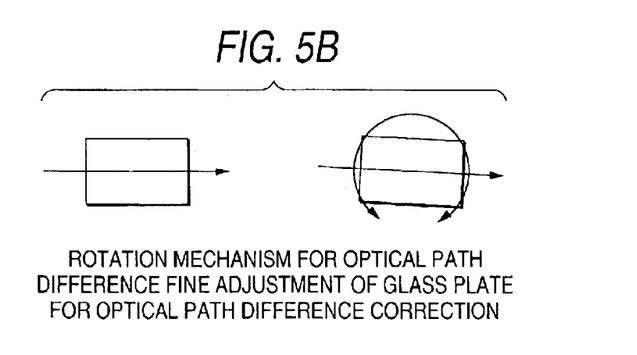

FIG. 5B is a diagram showing a rotation mechanism for optical path difference fine adjustment of the glass plate 13 for optical path difference correction, and the glass plate for optical path difference correction is rotated as shown in the drawing.

In this case, a correction of an optical path length according to a refractive index of the glass plate and a substantial length of the glass plate can be made by changing the substantial length of the glass with respect to the optical path shown by an arrow.

In the tunable filter to which the optical circulator of FIG. 5A is applied, the diffraction grating is used, so that the optical fiber 4 arranged opposed to the condenser lens 5 can be formed into one fiber to match the center of the optical fiber with the center of the condenser lens 5 while a wavelength variable range can be widened and also a PDL (polarization dependent loss) of the diffraction grating can be improved.

Therefore, in the configuration to which the optical circulator of FIG. 5A is applied, the need to arrange the total reflection mirror 12 in a length (F') equal to a focal length (F) of the condenser lens is eliminated and a selection of the condenser lens can be made freely and also a beam diameter can be designed thinly, so that the whole apparatus can be miniaturized.

Further, since a correction of the two optical path lengths split can be made, a tunable filter with small polarization mode dispersion (PMD) can be formed.

This tunable filter can suppress deterioration of a signal waveform and has a merit with respect to pulse light (modulation) mainly.

In the invention as defined in aspect 1, in a tunable filter for launching incident light from an input side optical fiber into a diffraction grating through a condenser lens and emitting emission light from the diffraction grating through the condenser lens and outputting output light of a selected wavelength through an output side optical fiber, one optical fiber common to input and output is provided between the input side optical fiber and the output side optical fiber and the condenser lens, and also optical circulator member is provided between the input side optical fiber and the output side optical fiber and the one common optical fiber, and thereby an optical fiber for input and output opposed to the condenser lens is formed into one fiber and constraint of a length between the condenser lens and a total reflection mirror can be eliminated.

Further, in the invention as defined in aspect 2, member for splitting incident light and member for rotating a plane of polarization of one of the split light 90° are provided between the condenser lens and the diffraction grating, and light with the plane of polarization rotated 90° and the other light polarized and split are launched into the diffraction grating and also an angle of incident light with respect to the diffraction grating is adjusted, and thereby output light of a selected wavelength can be obtained.

Further, in the invention as defined in aspect 3, by setting the light with the plane of polarization rotated 90° to light with a plane of polarization having low diffraction efficiency of the diffraction grating, a tunable filter with low loss can be constructed.

Further, in the invention as defined in aspect 4, the member for polarizing and splitting the incident light can be constructed of a cube type polarizer and a mirror.

Further, in the invention as defined in aspect 5, by adopting a parallelogram prism type polarizer as the member for polarizing and splitting the incident light, the cube type polarizer and the mirror can be constructed integrally and miniaturization can be done and also the need for the mirror is eliminated.

Further, in the invention as defined in aspect 6, by adopting a birefringent element as the member for polarizing and splitting the incident light, in a manner similar to the case as defined in aspect 5, the cube type polarizer and the mirror can be constructed integrally and miniaturization can be done and also the need for the mirror is eliminated. Further, rutile or calcite can be used as the birefringent element.

Further, in the invention as defined in aspect 7, output light from the diffraction grating is reflected by reflection member and is again launched into the diffraction grating, and thereby the diffraction grating can be passed two times, so that selectivity of a wavelength improves and only light with a wavelength of narrower range can be outputted.

Further, in the invention as defined in aspect 8, optical path difference correction member is inserted into at least one of optical paths of one light and the other light polarized and split, and thereby an optical path can be substantially lengthened by the optical path difference correction member inserted into a short optical path to equalize the two optical paths and deterioration of a signal waveform can be suppressed.

Further, in the invention as defined in aspect 9, an optical path length can be varied by a glass plate capable of adjusting an angle with respect to an optical path as the optical path difference correction member and more accurate adjustment can be made.

What is claimed is:

1. A tunable filter for launching incident light from an input side optical fiber into a diffraction grating through a condenser lens and emitting emission light from said diffraction grating through said condenser lens and outputting output light of a selected wavelength through an output side optical fiber, said tunable filter comprising:

one optical fiber common to input and output provided between said input side optical fiber and said output side optical fiber, and said condenser lens, and optical circulator member provided between said input side optical fiber and said output side optical fiber, and said one common optical fiber;

member for splitting incident light, and member for rotating a plane of polarization of one of the split light 90°, which are provided between the condenser lens and said diffraction grating, wherein light with the plane of polarization rotated 90° and the other light polarized and split are launched into the diffraction grating, and an angle of incident light with respect to said diffraction grating is adjustable.

2. The tunable filter as defined in claim 1, wherein the light with the plane of polarization rotated 90° is light with a plane of polarization having low diffraction efficiency of said diffraction grating.

3. The tunable filter as defined in claim 1, wherein said member for polarizing and splitting the incident light comprises:

a cube type polarizer, and a mirror.

4. The tunable filter as defined in claim 1, wherein said member for polarizing and splitting the incident light is a parallelogram prism type polarizer.

5. The tunable filter as defined in claim 1, wherein said member for polarizing and splitting the incident light is a birefringent element.

6. The tunable filter as defined in claim 1, wherein output light from said diffraction grating is reflected by reflection member, and is again launched into said diffraction grating.

7. The tunable filter as defined in claim 1, wherein an optical path difference correction member is inserted into at least one of optical paths of one light and the other light polarized and split.

8. The tunable filter as defined in claim 7, wherein said optical path difference correction member is a glass plate capable of adjusting an angle with respect to an optical path, and is capable to vary an optical path length.

* * * * *